Aug. 20, 1963 T. M. ELFVING 3,100,969
THERMOELECTRIC REFRIGERATION
Filed Aug. 3, 1960 5 Sheets-Sheet 1

INVENTOR.
THORE M. ELFVING
BY
Flehr & Swain
ATTORNEYS

Aug. 20, 1963 T. M. ELFVING 3,100,969

THERMOELECTRIC REFRIGERATION

Filed Aug. 3, 1960

5 Sheets-Sheet 2

INVENTOR.
THORE M. ELFVING
BY
Fehr and Swain
ATTORNEYS

Aug. 20, 1963 T. M. ELFVING 3,100,969

THERMOELECTRIC REFRIGERATION

Filed Aug. 3, 1960

5 Sheets-Sheet 3

INVENTOR.
THORE M. ELFVING
BY
Flehr and Swain
ATTORNEYS

INVENTOR.
THORE M. ELFVING
BY
Flehr and Swain
ATTORNEYS

INVENTOR.
THORE M. ELFVING
BY Flehr and Swain
ATTORNEYS

United States Patent Office 3,100,969 Patented Aug. 20, 1963

3,100,969

THERMOELECTRIC REFRIGERATION

Thore M. Elfving, 433 Fairfax Ave., San Mateo, Calif.

Filed Aug. 3, 1960, Ser. No. 47,161
11 Claims. (Cl. 62—3)

The present invention relates generally to thermoelectric heat pumps and more particularly to thermoelectric cooled systems such as may be incorporated in refrigerators and freezers.

Thermoelectric materials with a high figure of merit are now available for forming efficient thermocouples of suitable geometry. Thermocouple assemblies or modules of a standardized design are being manufactured. Thermoelectric refrigeration, economically comparable with absorption refrigeration, is theoretically possible.

There are, however, certain inherent problems in the practical application of thermoelectric heat pumps. These problems must be solved independently of figures of merit, couple geometry and other parameters. Prior art thermoelectric refrigeration systems and controls have not solved these problems.

It is a general object of the present invention to provide improved thermoelectric refrigeration systems.

It is well known that household refrigerators are normally provided with ice freezing facilities and require for this purpose temperatures ocnsiderably below freezing at ambient temperatures of +100° F. and above. For air cooled refrigerators, this means a temperature difference between the heat dissipating surfaces and the ice freezing radiator of at least 100° F. Presently available thermoelectric materials do not, under normal load conditions, economically allow such temperature differences in one stage operation. Two stage thermoelectric refrigeration is, therefore, a necessity for such air cooled devices. Two stage systems are complicated to build and difficult to control.

It is another object of the present invention to provide a simplified and improved cascade or multistage thermoelectric system.

An inherent problem of thermoelectric refrigeration has to do with the heat transfer at the hot and cold junctions. The heat to be absorbed or dissipated at each junction is usually very large in relation to the surface of the junction itself. Heat transfer to air without forced air circulation frequently requires a 100–200 time enlargement of the surface to obtain reasonably small temperature differences for best performance. The prior art design of thermocouple assemblies or modules and their heat transfer surfaces has led to large temperature drops and inefficient operation.

It is another object of the present invention to provide improved heat transfer rates and highly efficient heat absorbing and heat dissipating surfaces for the junctions of air cooled thermoelectric heat pumps.

Another drawback of thermoelectric refrigeration is the fact that the cold junctions and the hot junctions are permanently thermally connected. Therefore, when the electric current is cut off, there will almost immediately follow an equalization of the temperatures at the hot and cold junctions. This leads to heavy losses and rapid heating up of the refrigerated space when the electric current is interrupted.

It is a further object of the present invention to provide an improved heat transfer system in connection with thermoelectric heat pumps so that no losses of the above nature take place when the current is broken.

Due to the rapid equalization of temperatures between hot and cold junctions of thermoelectric systems, such systems have hitherto by necessity been operated continuously. The temperature control has taken place by so-called modulation, which means a change in the current supply but not an interruption. Such current modulation is difficult and costly to arrange.

Still another object of the present invention is to provide an improved and simplified temperature control for thermoelectric refrigeration systems.

According to my invention, thermostatic control of the temperature by interruption of the current is employed.

Additional objects and features of my invention will appear from the following description in which several embodiments of the invention are described with reference to the accompanying drawings.

Referring to the drawings.

FIGURES *4a*, *4b* and *4c* show in sectional and elevation view details of heat transfer systems and radiators according to the invention; and FIGURES *5a* and *5b* illustrate a small refrigerator with a thermoelectric refrigeration system in accordance with the invention. FIGURE *5b* is a sectional side elevational view of the refrigerator taken along the line *5b—5b* of FIGURE *5a*. FIGURE *5a* is a section taken along the line *5a—5a* of FIGURE *5b*.

Figure 1:
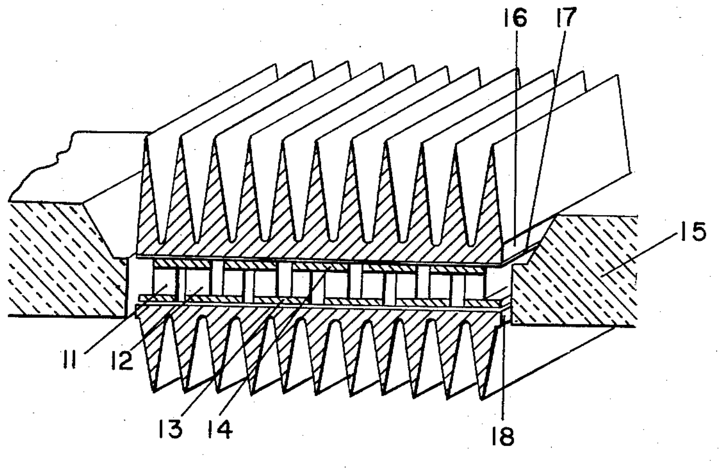
FIGURE 1 is a sectional diagrammatic view of a thermoelectric refrigeration unit illustrating the prior art.

In order to facilitate the understanding of the present invention, a description of the prior art is given. FIGURE 1 illustrates the prior art when applying thermoelectric cooling to household refrigeration systems and similar devices. The system includes thermoelectric couples comprising legs 11 and 12 of suitable semiconductor material or the like, forming cold junctions 13 and hot junctions 14. The structure is assembled into wall 15 of a refrigerator. The hot junctions are air cooled by a finned metal plate 16, separated from the junctions by a film 17 made from a material which is a good electric insulator and yet conducts heat relatively well. The cold junctions are in the same way absorbing heat on the inside of the refrigerator by means of a finned metal radiator 18 which cools the refrigerator. This radiator can naturally be provided with shelves or the like for receiving ice trays. One refrigerator cabinet can be provided with several such thermoelectric assemblies with their radiators in the walls and/or the ceiling. Not shown in FIGURE 1 are means for supplying the thermocouple assembly with direct currents of suitable magnitude, controls, etc.

The heat transfer between the radiator 18 and the air can be increased by using forced air circulation with the help of a small fan mounted inside the refrigerated space. The same goes with the outside radiator 16, where forced air circulation will increase the heat transfer rate and enable the fins to dissipate more heat with smaller temperature difference between the fins and ambient air. In some cases, the outside radiator is cooled by cooling water and sometimes also the inside radiator at the cold junctions is provided with a liquid circulating system driven by a small pump. This gives better heat transfer and better distribution of the refrigeration effect produced by the thermocouple unit. It is obvious that the introduction of mechanical means such as pumps reduces the inherent advantages of thermoelectric refrigeration.

When a suitable electric current is applied to the thermoelectric system in FIGURE 1, a large temperature difference is constantly maintained between the hot and the cold junctions whereby heat is removed from the inside of the refrigerator. When the current is interrupted and the thermoelectric system no longer functions, this temperature difference rapidly disappears. Heat flows from the warm radiator 16 over the semiconductor material forming the thermocouples to the cold radiator 18 inside the refrigerator. The heat resistance in the thermocouple assembly is very small compared to that of an insulated wall and this, in combination with the finned surfaces, causes a large heat intake, which rapidly heats up the refrigerated space. Therefore, modulation of constantly flowing electric current is employed to control temperature.

An application of this type can utilize a two stage cascade system. The hot junctions of the first stage are directly cooled by the cold junctions of the second stage. A greater number of thermocouples is necessary in the second stage to cool the hot junctions, the proportion often being 1:2 or 2:5. Direct contact is hampered by the difference in surface size. The thermal contact between hot junctions in the first stage and cold junctions of the second stage is carried over a thick metal plate in order to reduce the temperature drop sidewise when the heat flows from the small surface of the first stage to the larger second stage assembly.

The same drawbacks apply to the described two stage system as to the single stage system as far as losses and temperature control is concerned. Modulation of cascade systems is more complicated than modulation of single stage units because of the necessity to maintain a balance between the two stages undisturbed. If, for instance, the first stage dissipates more heat at its hot junctions than the second stage can absorb by its cold junctions, then the efficiency and the economy will drop considerably. A change in the current does not always change the heat capacity of the two stages equally, with unbalance as a result.

The heat transfer arrangement shown in FIGURE 1, where the hot junctions are directly air cooled by means of an attached finned radiator is inefficient. The size of thermoelectric couple assemblies or modules is comparatively small and the radiator, therefore, also limited in size. The radiator surface from which the fins are projected cannot be made much larger than the surface of the thermocouple assembly without considerable temperature drops sidewise. Therefore, finned radiators according to prior art, as shown in FIGURE 1, can only offer a limited surface for air cooling. This means a large temperature drop between the ambient air and the hot junctions for the dissipation of the large heat load on these junctions. As previously described, the economical use of air cooled thermoelectric heat pumps is largely dependent upon the reduction of such temperature drops.

Figure 2:
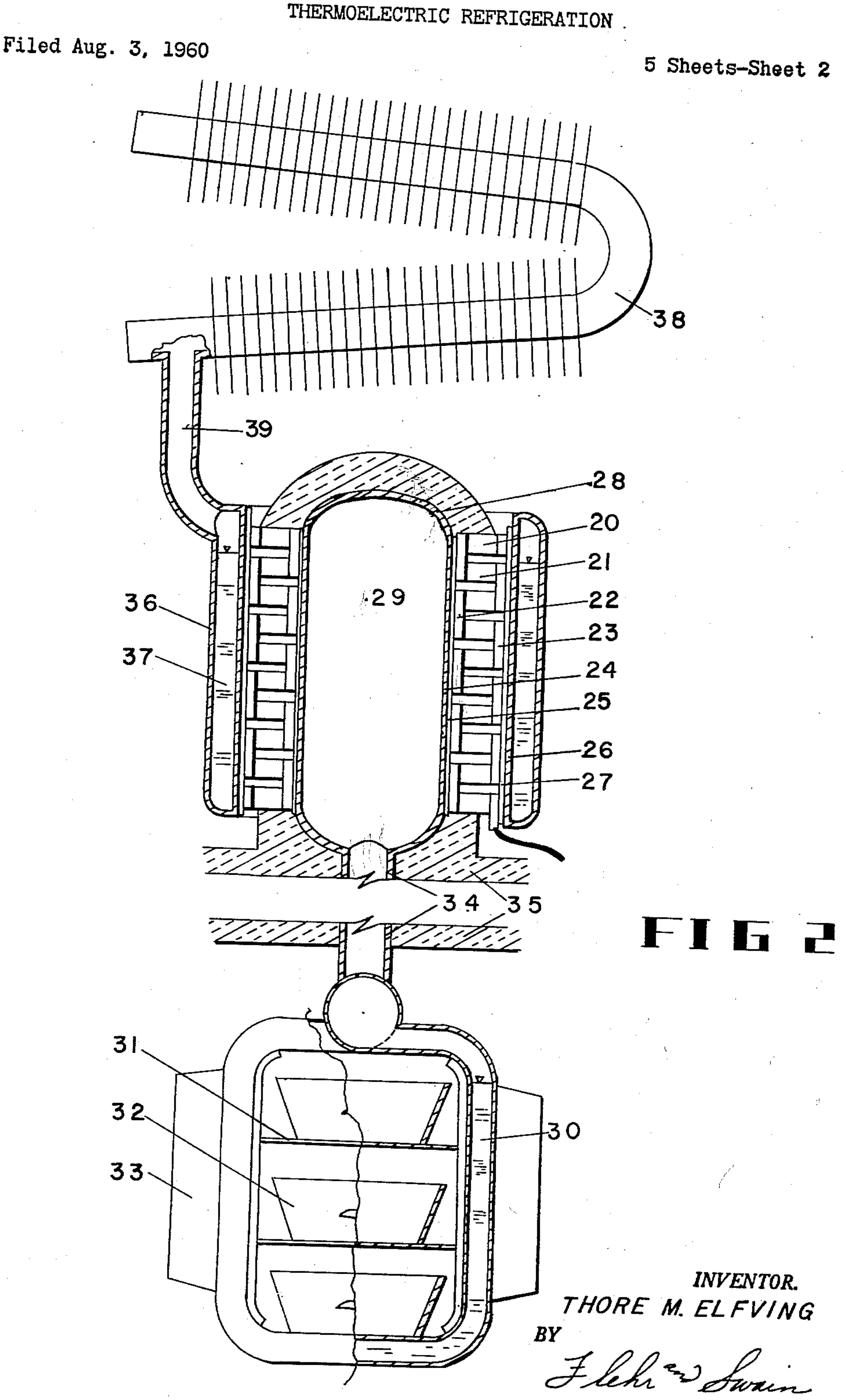
FIGURE 2 is a sectional elevation view of a thermoelectric refrigeration system incorporating the present invention.

An embodiment of a thermoelectric heat pump according to the invention is shown in FIGURE 2. The assembly illustrated is a cylinder in form and includes a multitude of thermocouples, each couple having legs 20 and 21 made from N- and P-type bismuth telluride or from another suitable thermocouple material, for example, semiconductor material. The cold junctions 22 and the hot junctions 23 are made from copper or some other suitable materials. The thermocouples are arranged in an array around an inside metal cylinder 24 which is electrically separated from the cold junctions 22 by a thin membrane 25. The warm junctions are in a similar way in close contact with an outer metal cylinder 26, from which they are electrically insulated by another thin membrane 27. As an example, such films or membranes may be a silicon lacquer or other plastic lacquer mixed with a few percent aluminum flakes to give good thermal conduction. A coating of polyvinylchloride, cellulose acetate or silicon lacquer directly on the metal surface of the junctions and the contacting metal also serves the purpose of providing electrical insulation with relatively good heat transfer. The thermocouples should be mounted between the two cylindrical surfaces in a tight fit for best possible heat transfer.

The inside cylinder 24 includes an insulated top 28. The cylinder forms the condensing or heat dissipating upper part 29 of a hermetically sealed heat transfer system. The system contains a volatile liquid, such as Freon, ammonia, acetone, or alcohol, as heat transferring medium. The lower or heat absorbing part of the hermetically sealed system consists of an evaporator 30 which, as illustrated in the figure, has been given the form of a refrigerator radiator. The radiator includes shelves 31 for ice freezing trays 32 and fins 33 for cooling of the air in a refrigerator. The evaporator system 30 is connected to the condenser part 29 by an insulated pipe 34 through the insulation 35 forming the refrigerated space.

Before filling the system with a suitable amount of liquid and gas, the system should be evacuated so that no air is present. The heat transfer in such a system takes place by boiling the volatile liquid contained in the system at the lower portion, radiator, of the system where heat is absorbed and condensing the liquid at the upper part, condenser, of the system where heat is dissipated. The heat rate or heat transmission coefficient between a metal wall and a condensing or boiling medium is very high compared with the heat rate at surfaces in contact with air or ordinary liquids. This is of particular importance in connection with thermoelectric refrigeration, where the junctions require a large heat absorbing or heat dissipating capacity in relation to their surface.

In FIGURE 2 the metal cylinder 26 in thermal connection with the hot junctions 23 is provided with a jacket cylinder 36 forming a chamber 37 around the cylinder 26. The chamber 37 comprises, according to the invention, the lower heat absorbing part of another hermetically sealed system. The system includes a volatile liquid which absorbs the heat dissipated from the hot junctions 23 of the thermoelectric assembly. The upper heat dissipating part of this hermetic system is in the form of a fin pipe system 38. The volatile heat transfer medium condenses while giving off heat to the surrounding air through the very large fin area. The condensed medium in the coil 38 flows as a liquid back to the cooling pocket 37 through the connecting pipe 39, in which, consequently, vapor and liquid meet in a counter-flow. A similar system comprises the condenser 29 and the pipe system 30.

The assembly shown in FIGURE 2 is representing a one-stage thermoelectric system, in which the hot junctions are cooled by a boiling medium and the cold junctions are absorbing heat from a condensing medium. The whole system serves as a heat pump for removing heat from the ice-freezing device 30 at low temperature and delivers the same heat plus the energy used in the couples to the surrounding air at a much higher temperature.

The relationship between the absorbed heat and the energy input, the so-called coefficient of performance or COP, depends upon many factors beside the properties of the material in the couples. One very important factor is the temperature difference between the hot and cold junctions, which in its turn depends upon the size and effectiveness of the ultimate heat dissipating surfaces, in this case the fin pipe system 38. The described system makes it possible to operate with minimum temperature drops at the junctions and with almost unlimited final heat transfer surfaces to the surrounding air, independent of the size of the thermocouple assembly. It, therefore, creates optimal conditions for rendering the thermoelectric system efficient.

Another important property of the described system is the fact that the heat flow from the heat absorbing parts of the system (ice freezing radiator 30) to the ultimate heat dissipating surfaces exposed to the air will not be reversed when the current to the thermoelectric couple assembly is interrupted. The temperature of the cold and hot junctions will rapidly equalize but the hermetic heat transfer system will not transfer heat from the couple assembly to the refrigerator radiator. The only losses apart from heat losses through the insulation will be by conductivity in the pipe connection 34 which would be of the same magnitude as in conventional refrigeration systems and from practical viewpoint insignificant. The importance of this feature of hermetic systems in combination with thermoelectric cooling, according to the invention, will be presently described.

Figure 3:
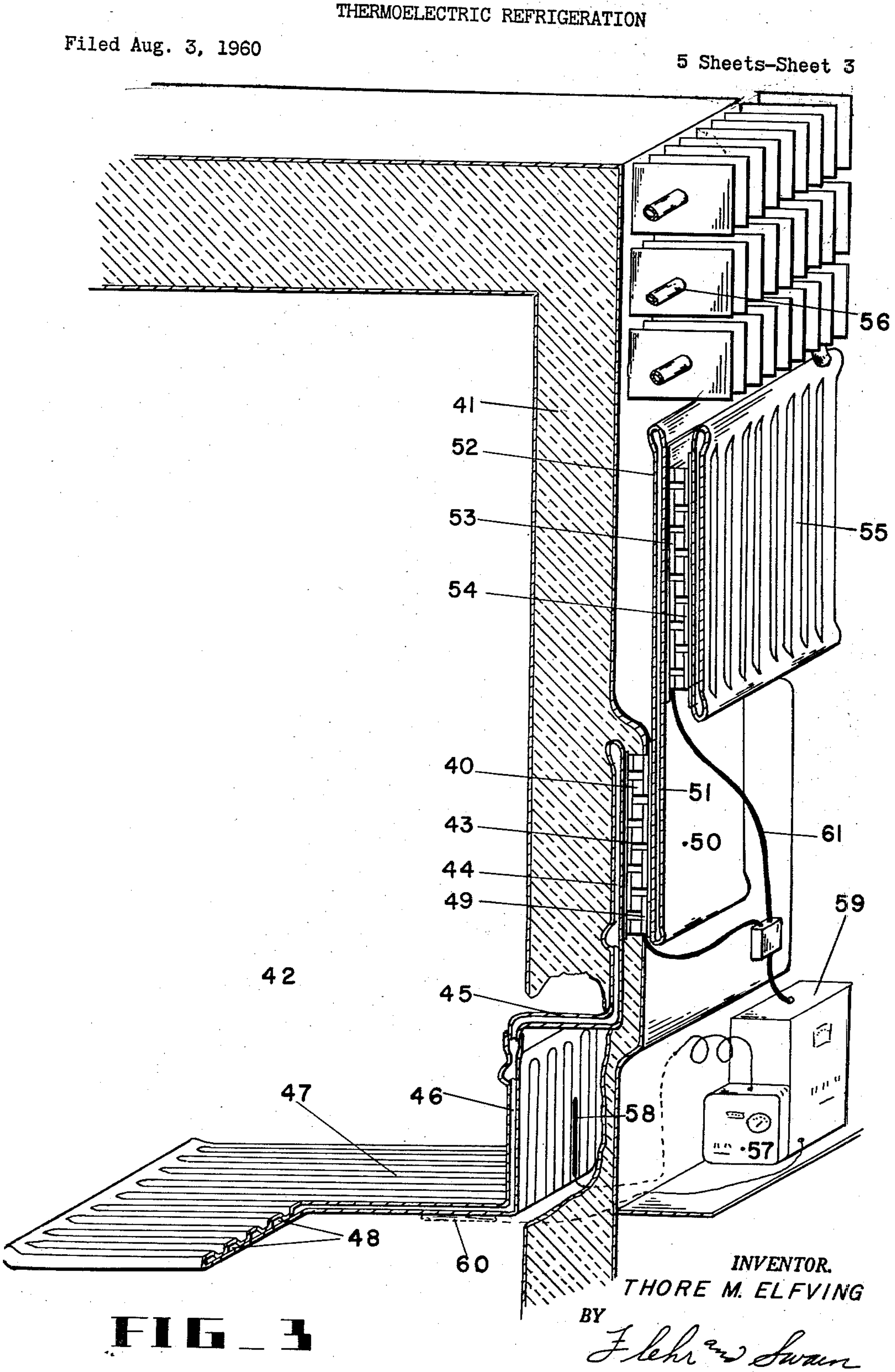
FIGURE 3 is a partial side elevational view in section showing a two stage system.

FIGURE 3 shows a thermoelectric cascade system including two stages according to the invention. The first stage thermocouple assembly 40 is built in the shape of a plate and placed vertically in the insulation of the insulated wall 41 of the refrigerated compartment 42. The cold junctions 43 absorb heat released by a condensing medium in the flat aluminum condenser 44 which is clamped to the couple assembly on the cold junction side. The condenser 44 comprises the upper heat dissipating part of a hermetically sealed system. It is connected by a pipe 45 through the insulated wall 41 to its heat absorbing part, evaporator. The evaporator is in the form of a freezer having a vertical wall 46 and a horizontal bottom 47, both made of bonded aluminum and provided with communicating fluid channels 48. The hot junctions 49 of the first stage assembly 40 are in the same way thermally connected to a similar flat evaporator 50 which through a multitude of passages 51 communicates with the flat condenser 52. This forms a second intermediate heat transfer system. The condenser 52 is attached to the second stage couple assembly which absorbs the heat dissipated by the condenser 52 at its cold junctions 53. The hot junctions 54 of the same couple assembly are cooled by means of a third hermetic system comprising the flat bonded boiler or evaporator portion 55 and a fin pipe system 56.

The second stage couple assembly has to be balanced to the first stage so that the heat given off by the hot junctions 49 of the first stage can be wholly absorbed by the cold junctions of the second stage. If couples of the same material and geometry are used in both the first and second stage assembly, it means that there should be 2–4 times as many couples in the second stage as there are in the first stage. The ratio is dependent upon the COP (coefficient of performance) of the first stage. The second stage assembly, therefore, requires more surface and space than the first stage, as indicated.

An example of a suitable system will illustrate the heat balance. Assuming that it is desired to produce a refrigeration effect of approximately 100 B.t.u./hr. or approximately 29 watts in an air cooled refrigerator at an ambient temperature of +35° C. and with −10° C. in the freezer radiator. This represents a net temperature difference of 45° C., which because of temperature drops in the system, is increased to approximately 60° C. If we divide this evenly between the two stages, it means a temperature difference between the hot and cold junctions in each assembly of $\Delta T=30°$ C. Assume that there are available thermocouples made from a semiconductor material with an average figure of merit of, say, $Z=3\times10^{-3}1/°$ C.

Assume that typical performance curves for thermocouples of a suitable geometry show a heat pumping capacity of approximately 0.8 watt per couple at a current of approximately 15 amps. and a coefficient of performance (COP) of around 0.7 for the same current. With this information, one can calculate the number of couples necessary in each stage in the following way: 36 thermocouples in the first stage will produce the desired refrigeration effect, $36\times0.8$ watts=28.8 watts. With a COP of 0.7, this means an energy input by the electric current of $$\frac{28.8}{0.7}=41.1 \text{ watts}$$

Together with the heat absorbed by the cold junctions, this means a total of 28.8+41.1=69.9 or 70 watts dissipated at the hot junctions of the first stage. A corresponding cooling capacity has to be produced by the cold junctions of the second stage. The second stage, therefore, requires $$\frac{70}{0.8}=87.5$$

or 90 couples as a round figure. 36 couples in the first stage and 90 in the second is a relation of 2:5. The heat dissipated at the hot junctions of the second stage amounts in the same way to $$70+\frac{70}{0.7}=170 \text{ watts}$$

in relation to a heat pumping capacity from −10 to +35° C. of only 29 watts. This figure illustrates the necessity of very large and efficient cooling surfaces. The use of a third heat transfer system, according to the invention, makes it possible to dissipate the heat from the final hot junctions through an efficient cooling system of sufficient area, whereby air cooling with reasonably small temperature drop is possible. Even so, it is, according to the invention, advisable at higher heat pumping capacities to use a simple fan for forced air circulation on the final fin system in order to increase the heat transfer rate above that of natural convection. This is of particular importance for cascade systems. It should be emphasized here that we are considering air cooled heat pump devices. With water cooling, heat dissipation in the final stage offers no problem.

The temperature balance for the cascade system described above will be as follows: Freezer radiator −10° C., first stage cold junctions −13° C., first stage hot junctions +17° C. ($\Delta t=30°$ C.), second stage cold junctions +15° C., second stage hot junctions +45° C. ($\Delta t=30°$ C.), fin temperature +42° C., air temperature +35° C. The above temperatures are round figures and some of the temperature differences can naturally be divided into several steps. There is, for instance, certain temperature drops inside the hermetic systems due to small pressure differences between the boiling and condensing medium, also certain temperature drops in the electric insulator at the junctions. The temperature drop between the metal wall and the boiling fluid at the hot junction is of a special nature and shall be discussed in connection with FIGURE 4. Only a system, according to the invention, with heat transfer through boiling and condensing media would allow the small total temperature drops indicated above for an air cooled heat pump in this type of application.

In FIGURE 3 is also shown a thermostat 57 with the sensitive bulb 58 attached at a suitable place inside the refrigerator to control the temperature. This thermostat may, according to the invention, be of the type for intermittent operation. Cabinet 59 indicates a rectifier which has preferably less than 10% ripple to supply the direct current power through cable 61 to the thermoelectric system. The thermostat 57 may be employed to interrupt the incoming high voltage supply, which means switching a low ampere current. This method of temperature control in combination with thermoelectric refrigeration, according to the invention, is possible because of the introduced hermetic systems between the air cooled part of the system and the parts inside the refrigerator. It is obvious that this feature of the invention can be achieved by using only one hermetic system, acting as a one way thermal valve between the heat absorbing parts inside the cold space and the heat dissipating parts in the outside air. It should also be emphasized that the thermostatic temperature control by intermittent operation is a possibility, not a necessity. Current modulation in the known way can also be applied to the described heat pump system. For household devices, however, the thermostat control according to the invention is simpler and less costly.

When using hermetic heat transfer systems in connection with thermoelectric heat pumps, according to the invention, the heat flow can go only in one direction. Defrosting or heating of the refrigerated space by reversing the current through the couples is not possible. In FIGURE 3 are indicated an electric heating element 60 in thermal contact with the fluid in the lower part of the freezer radiator 47. This heating element can be switched in when defrosting of the radiator 47 is desired. Because of the function of the hermetic system, the heating element will effectively defrost every part of the heat transfer system between the cold junctions of the first stage and the freezer radiator. In FIGURE 3 it is indicated that the entire first stage assembly is surrounded by insulation material. In practice it would, according to the invention, be possible to embed the whole thermoelectric system in an insulation and have nothing but the final fin pipe system exposed to the air.

As pointed out, the couple assemblies shown in FIGURE 3 are of different size according to the difference in capacity requirements and number of thermocouples for the first and second stages. When using heat transfer systems in accordance with the invention, standardized couple assemblies or modules can be clamped to the flat heat transfer systems in the same proportion as the number of thermocouples. In this case two modules containing 18 couples each for the first stage and 5 modules of the same size for the second stage would make up the number of couples required. FIGURE 4 illustrates how such standardized modules are combined with their heat transfer systems.

Figure 4A:
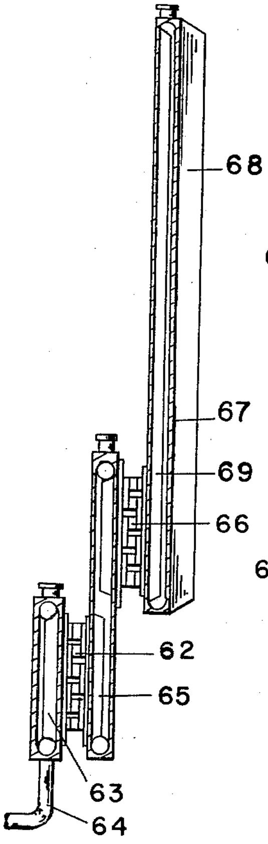
Figure 4B:
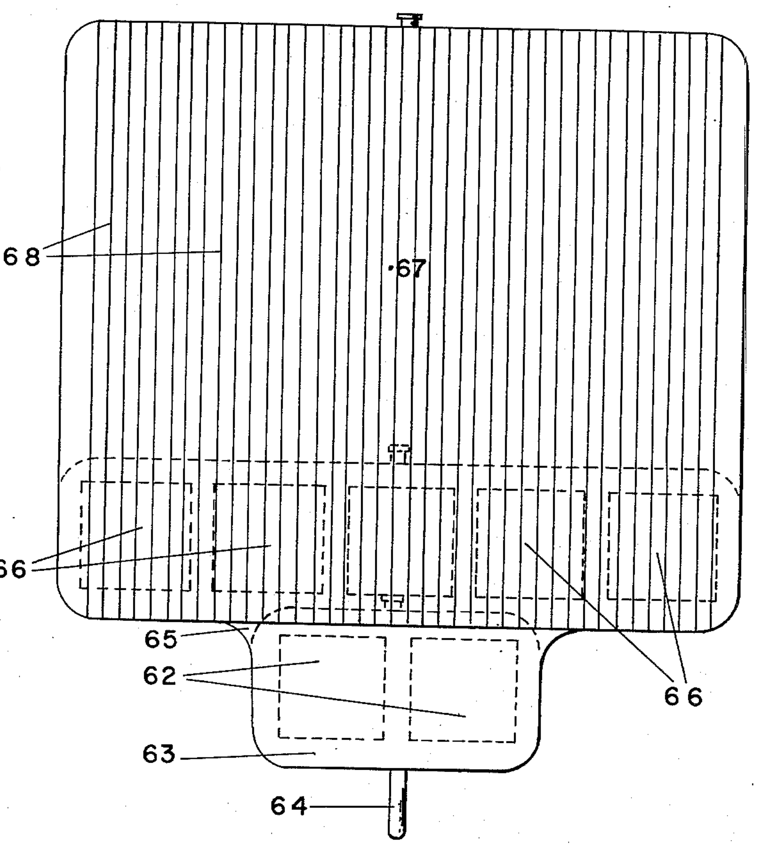
Figure 4C:
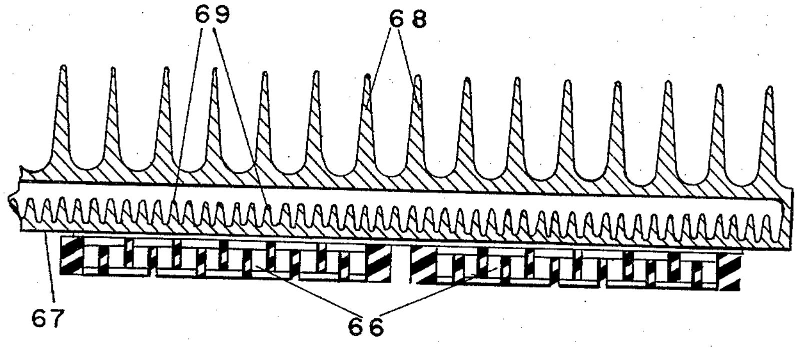

In FIGURES 4*a*, 4*b* and 4*c*, the two first-stage modules 62 have their cold junction sides in contact with the condensing part 63 of a hermetic system which through pipe 64 is connected with a heat absorbing part in the refrigerated space. The hot junction side is in thermal contact with the intermediate heat transfer system 65 which thermally connects the hot junctions of the first stage modules and the cold junctions of the second stage modules 66. This intermediate hermetic system corresponds to the thick copper plate between the two stages mentioned in connection with the description of prior art.

The size of the upper heat dissipating part of this system connected with the second stage can be made much larger than the lower part connected with the first stage without temperature drops sidewise and such an intermediate system is, therefore, convenient and efficient to use when there is a great difference in size between the first and the second stage assembly of modules. The hot junctions of the second stage 66 are connected to the final hermetic system 67 which through fins 68 delivers the heat to the ambient air. All the parts of the hermetic systems in contact with the modules shown in FIGURES 4*a*, 4*b* and 4*c* may be made from aluminum with carefully planned outside contact surfaces.

Thermoelectric modules of the type referred to above can be built very compact so that the size for a module containing 18 couples may be only 2" x 2" or slightly more. The heat given off at the hot junctions of such a module may, as shown in the calculation example above, be 35 watts or close to 9 watts per square inch which corresponds to more than 4000 B.t.u./hr. sq. ft. or 10,000 kcal./m.$^2$, hr. As previously mentioned, such high heat loads are characteristic for thermoelectric heat pump applications and call for specific measures also when the heat transfer takes place to a boiling medium. Certain heat transfer media like ammonia have very high heat transmission coefficients to a metal wall when boiling. Due to pressure considerations and toxicity, ammonia is less suitable for use in the kind of application we are considering here and a medium like Freon 11 or 12 is preferable. Heat transmission coefficients for boiling Freon are not completely known but experiments have shown that the heat transfer rate is much lower than for boiling ammonia and that large temperature drops may occur if the surface load is large. Therefore, according to the invention, the heat absorbing part of the hermetic heat transfer systems described in FIGURE 4 have extended surfaces on the inside of the flat wall clamped to the hot junctions. In this way the contact surface to the boiling medium can be increased up to ten times which reduces the temperature drop between the flat contact surface and the boiling fluid correspondingly. According to the invention, also heat dissipating parts of the hermetic systems described are provided with extended surface when the heat load is large even if the heat transfer rate for condensing media is much higher than when boiling. The extended surfaces may be formed by providing ridges and grooves or by other suitable means.

FIGURE 4*c* shows how such extended surfaces are applied. Modules 66 are on the hot junction side in thermal contact with the outside flat wall of an evaporator-radiator 67 comprising the heat absorbing part of a hermetic system filled with volatile liquid in the boiler portion. The carefully planned wall has, according to the invention, extended surfaces on the inside in the form of parallel fins 69, which enlarge the contact surface to boiling liquid from four to ten times over the projected flat contact surface. As shown in the figure, the outside of the evaporator-radiator 67 is provided with large vertical fins 68 to increase the heat dissipation to the ambient air. The whole structure with inside and outside fins can be manufactured from extruded aluminum profiles of the same sectional design as shown in the figure.

It should be emphasized that, although concentrated small size thermoelectric modules are valuable for applications in the electronic and other fields, the modules used for refrigeration applications with heavy loads should be built with a larger exposed surface to reduce the specific heat load as discussed above.

Figure 5A:
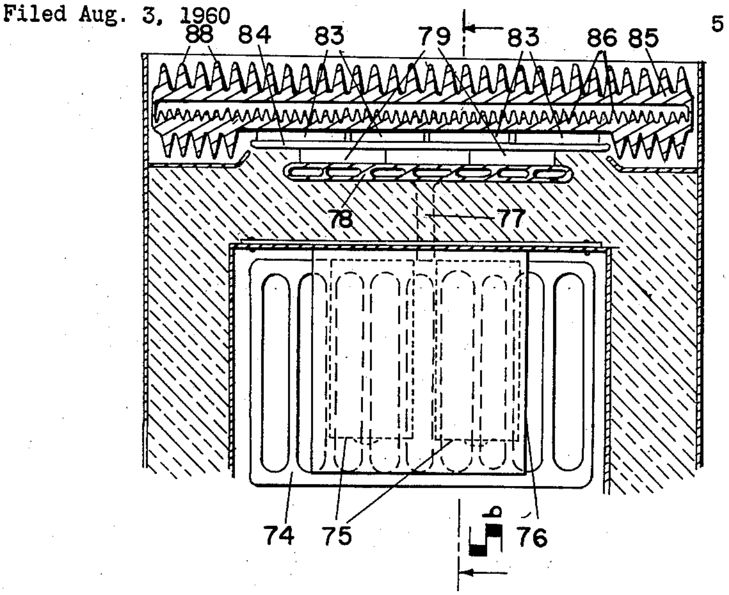
Figure 5B:
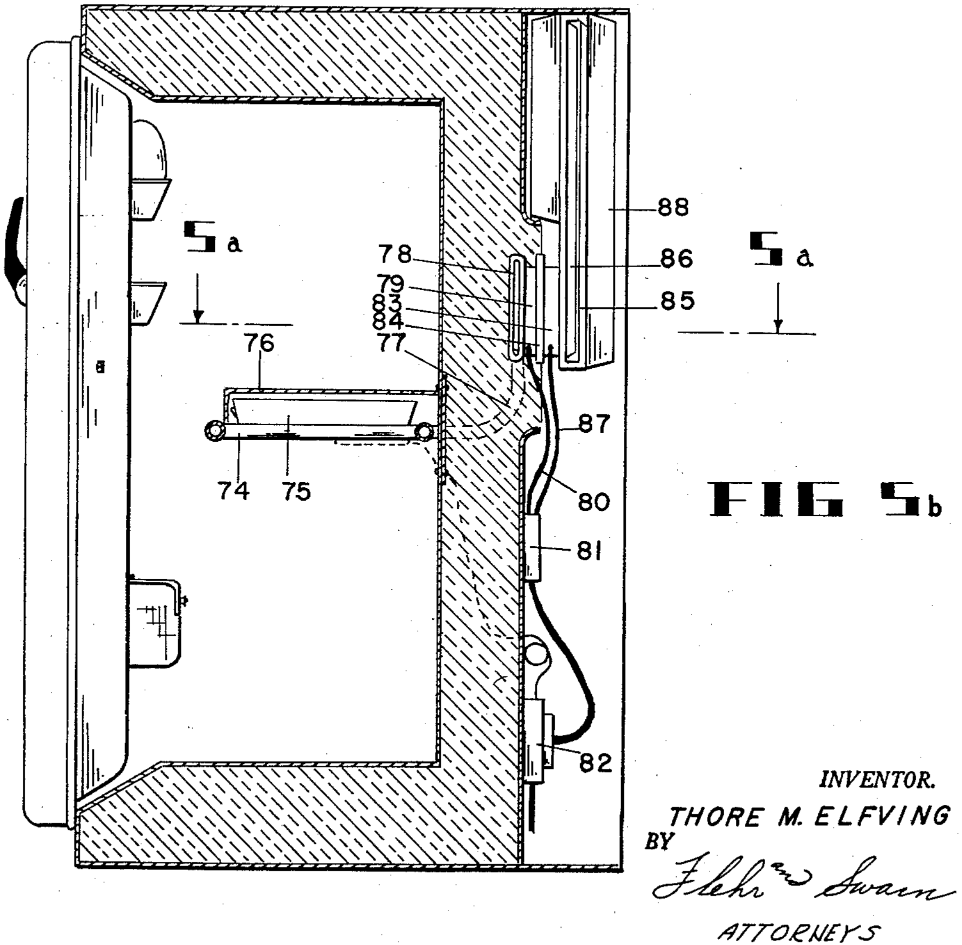

Referring to FIGURES 5*a* and 5*b*, there is shown a thermoelectric refrigerator suitable for automobiles or boats incorporating the present invention. The refrigerator can be driven directly from a battery.

The refrigerator shown has an inside volume of approximately one cubic foot with ice freezing capacity in two trays at an ambient temperature of 100° F. or +38° C. The radiator is in the form of an ice-freezer shelf with place for ice trays. A plastic cover 76 may be provided. Ice freezing requires a shelf temperature of −10° C. (+14° F.) and a cascade system in two stages, each with a T of 30° C., is necessary. To reduce the final heat dissipating surface, the couples are generated at maximum COP. The same type of couples mentioned in FIGURE 3 are used in standardized modules each containing 18 couples. In one type of couple, the max. COP at a T of 30° C. occurs at a current of 11 amps. and has the value of COP max.=1.0. At this current the heat pumping capacity per couple is 0.5 watts and each module, therefore, gives 9 watts of refrigeration or 7¾ kcal./hr. or approximately 31 B.t.u.'s/hr. Two such modules have a refrigeration capacity of 18 watts=15.5 kcal./hr. or 62 B.t.u./hr., which is ample capacity for a one cubic foot cabinet with good ice freezing. A further calculation shows that the second stage will be able to absorb the heat from the first stage if four modules of the same size are used. The heat dissipated at the hot junctions of the second stage amounts to 72 watts or 62 kcal./hr. (246 B.t.u./hr.).

The above calculation indicates the economy of the system as far as refrigeration capacity and energy input (wattage) is concerned. It also shows the requirements as to final heat dissipating surfaces, the large size of which is indicated on the drawing. As to the number of couples and modules, it should be noticed that the calculation is based on the use of fairly large couples with a leg diameter of 7 mm. The required operating current of 11 amps. is rather high for battery operation and couples made from rod material of smaller diameter are more suitable. An operating current of 1–4 amps. is obtainable with such couples but would require a correspondingly larger number of modules. To simplify the drawing and to illustrate the invention, the above example was chosen. It should be noted that the use of heat transfer systems, according to the inventions, makes it possible to conveniently attach or glue to the flat condenser or evaporator parts of the hermetic systems as many modules as desired, space permitting. Capacity is changed by simply adding or removing modules without changing conduits or surface arrangements.

In FIGURE 5 is shown the ice freezer shelf 74 with ice trays 75 and a cover 76. The shelf 74 forms the lower part of a hermetic system filled with a refrigerant as heat transferring medium and is connected by the pipe 77 through the insulation to the upper vertical part 78 of the hermetic system which is clamped or glued to the cold junctions of the two first stage modules 79. The modules 79 of the first stage are supplied with D.C. current through the cable 80, which over a terminal box 81 and the thermostat 82, is connected to a battery. The hot junctions of the first stage 79 are thermally connected to the cold junctions of the second stage modules 83 by a thick copper plate 84, with the modules placed as indicated on the drawings. This copper plate can in other cases be substituted by a hollow radiator serving as intermediate heat transfer systems as described in FIGURE 4. The hot junctions of the second stage 83 are thermally connected to the large extruded aluminum radiator 85 with inside fins 86 of the type described in FIGURE 4. The second stage modules 83 are supplied with electric current by the cable 87 from the terminal box 81.

The radiator 85, which occupies the available space behind the refrigerator, comprises a complete heat transfer system, partly filled with a suitable medium like Freon by which the temperature of the inside surface is equalized regardless of the size of the radiator. The lower portion is in intimate thermal contact with the hot junctions of the second stage modules. The area on which these modules are attached should, according to experimental results, be provided with inside fins as indicated. Outside fins 88 for air cooling can be provided on both sides. The modules can be clamped on the radiator in a known way but they can also, according to the invention, be glued to the aluminum radiator by means of a suitable lacquer of electrical insulating properties as previously mentioned. The gluing process should be carried out in such way that the layer of lacquer between the junctions and the aluminum radiator is relatively thin, which with the lacquers mentioned will provide adequate electric insulation with a minimum temperature drop.

The refrigerator unit shown in FIGURE 5 is shown as a typical application of the invention. The thermoelectric heat pump is shown as a two stage unit but it is obvious that the same layout can be used for a one stage heat pump, in which case the final heat dissipating system is simply connected to the hot junctions of the single stage. Whether one or two stages should be used is dependent upon the temperature requirements inside the refrigerator and naturally, also on the figure of merit of the available thermocouples. With a Z-factor of 4–5, a refrigerator system, according to the invention, could be built with only one stage.

In the shown embodiments of the invention, the thermocouple assemblies and modules are shown in a vertical position. They can also be placed in a horizontal array with attached evaporators and condensers as described. When a horizontal position of the flat modules is used, the cold junctions should, according to the invention, be faced downwards while the hot junctions are facing upwards. The condensation in the attached condenser will then take place against a flat ceiling surface under favorable heat transfer conditions. In the same way, the boiling of the volatile liquid in an evaporator, according to the invention, will take place against a ribbed bottom with a high heat transfer rate to a boiling liquid.

A thermoelectric refrigerator of the type described can, according to the invention, be driven by city gas or any other burner fuel by using a thermoelectric power generator for feeding the thermocouple modules with electricity. Thermoelectric generators of suitable capacity up to a few hundred watts are in production. Gas heated furnace devices of this type can be maintenance free for long periods and are sufficiently economical for driving small thermoelectric heat pumps of the type described in places where other sources of electricity are not available.

The described refrigerator application of thermoelectric heat pumps is simple to build, provides efficient refrigeration and gives the designer the choice of using almost any type of ice freezer radiator. It can use thermostats instead of modulators and can be built in almost any size for refrigerating fractions of a cubic foot upwards.

It is seen that I have provided a thermoelectric heat pump system with improved heat transfer systems and improved and simplified controls.

I claim:

1. A thermoelectric heat pump comprising first and second thermocouple assemblies each having hot and cold junctions, means for thermally connecting the hot junctions of the first thermocouple assembly to the cold junctions of the second thermocouple assembly, said means comprising an intermediate hermetically sealed one-way heat transfer system including an evaporator thermally connected to the hot junctions of the first thermocouple assembly and a condenser thermally connected to the cold junctions of the second thermocouple assembly, said evaporator and condenser being disposed at different horizontal levels whereby the thermocouple assemblies connected to the evaporator and condenser are spaced from one another to minimize the transfer of heat between the same, a first hermetically sealed one-way heat transfer system, said first hermetically sealed one-way heat transfer system including an evaporator for cooling and a condenser in heat exchange relationship to the cold junctions of the first thermocouple assembly, a second hermetically sealed one-way heat transfer system, said second hermetically sealed one-way heat transfer system including a second evaporator in heat exchange relationship to the hot junctions of the second thermocouple assembly, an air-cooled condenser forming the heat dissipating part of the second hermetically sealed one-way heat transfer system, means for applying electric current to said first and second thermocouple assemblies to thereby cool the cold junctions whereby heat is absorbed by the first evaporator and transferred to the air-cooled condenser, and means connected to control the application of electric current to said thermocouple assemblies.

2. A thermoelectric heat pump comprising first and second thermocouple assemblies each having hot and cold junctions, means for thermally connecting the hot junction of the first thermocouple assembly to the cold junction of the second thermocouple assembly, said thermal connecting means comprising a hermetically sealed heat transfer system partly filled with a volatile liquid providing one-way heat transfer, said heat trasfer system including an evaporator in heat exchange relationship to the hot junctions of said first thermocouple assembly and a condenser in heat exchange relationship to the cold junctions of said second thermocouple assembly, said volatile liquid evaporating in the evaporator and absorbing heat from the associated hot junctions of the first thermocouple assembly and the vapor condensing in the condenser and releasing heat to the cold junctions of the second thermocouple assembly to provide said one-way heat transfer, said condenser being spaced from and disposed at a higher level than said evaporator whereby the first and second thermocouple assemblies in heat exchange relationship with the evaporator and condenser respectively are spaced from one another to minimize direct transfer of heat between the same, and means for applying power to said first and second thermocouple assemblies.

3. A thermoelectric system as in claim 2 wherein said last means includes a power supply for applying direct electric current to said first and second thermocouple assemblies, means for applying alternating electric current to said power supply, and a thermostatic means for sensing the temperature at the refrigerated space and serving to control the intermittent application of power to said first and second thermocouple assemblies.

4. A thermoelectric heat pump comprising a thermocouple assembly having hot and cold junctions, a condenser in heat exchange relationship with the cold junctions of said thermocouple assembly, an evaporator, said condenser and evaporator formed by different portions of a hermetically sealed system partly filled with a volatile liquid, said system including first and second plates joined at distributed contact areas to form a multitude of passages, the condenser portion of said system disposed above the evaporator portion, means for applying electric current to said thermocouple assembly, and means including a thermostat for sensing the temperature at the evaporator and serving to intermittently apply direct current to the thermocouple assembly to thereby maintain a predetermined temperature at the evaporator.

5. A heat transfer system as in claim 4 wherein said evaporator portion of said hermetically sealed system is horizontal and the condenser portion is vertical.

6. A thermoelectric system comprising first and second thermocouple assemblies each having hot and cold junctions, an evaporator and a condenser formed by different portions of a hermetically sealed heat transfer system partly filled with a volatile liquid, said system including first and second plates joined at a multitude of predetermined areas to form a multitude of passages, the condenser portion of said system disposed above the evaporator portion, the evaporator portion being disposed in thermal contact with the hot junctions of the first thermocouple assembly and the condenser portion in thermal contact with the cold junctions of the second thermocouple assembly, and means to supply electrical energy to the first and second thermocouple assemblies.

7. A thermoelectric heat transfer system as in claim 6 which includes additionally a second hermetically sealed heat transfer system partly filled with a volatile liquid having an evaporator portion and a condenser portion, said second system including first and second plates joined at a multitude of areas to form a multitude of passages, said condenser portion disposed above the evaporator portion, and means forming a thermal connection between the condenser portion and the cold junctions of the first thermocouple assembly.

8. A heat transfer system as in claim 7 wherein said evaporator portion of said second hermeticaly sealed heat transfer system is at least partly horizontal.

9. A thermoelectric refrigeration system including at least one thermocouple assembly having hot and cold junctions, a hermetically sealed one-way heat transfer system including an evaporator portion for absorbing heat and a condenser portion, said condenser portion having an outer surface which is a surface of revolution, the cold junctions of said thermocouple assembly being placed in thermal contact with said condenser portion of the hermetically sealed heat transfer system, heat dissipating means thermally connected to the hot junctions of said thermocouple assembly, and means for supplying direct current power to the thermocouple assembly.

10. A thermoelectric heat pump assembly comprising first and second stage thermocouple assemblies each having hot and cold junctions and spaced from each other, a hermetically sealed heat transfer system partly filled with volatile liquid including an evaporator in heat exchange relationship to the hot junctions of said first thermocouple assembly and a condenser at a higher horizontal level than the evaporator in heat exchange relationship with the cold junctions of said second thermocouple assembly, whereby the volatile liquid evaporating in the evaporator absorbs heat from the hot junctions of the first thermocouple assembly and the condensing vapor in the condenser releases heat to the cold junctions of the second thermocouple assembly, and means for supplying direct electric current to said first and second thermocouple assemblies.

11. A thermoelectric heat pump comprising a thermocouple assembly having hot and cold junctions, a condenser in heat exchange relationship with the cold junctions of said thermocouple assembly, an evaporator, said condenser and evaporator formed by different portions of a hermetically sealed system partly filled with a volatile liquid, said system including first and second plates joined directly to one another at distributed contact areas to form a multitude of passages, the condenser portion of said system disposed above the evaporator portion, and means for applying electric energy to said thermocouple assembly.

References Cited in the file of this patent

UNITED STATES PATENTS

| | | |
|---|---|---|
| 1,808,494 | Carney | June 2, 1931 |
| 2,157,012 | Philipp | May 2, 1939 |
| 2,573,538 | Brown | Oct. 30, 1951 |
| 2,734,344 | Lindenblad | Feb. 14, 1956 |
| 2,749,716 | Lindenblad | June 12, 1956 |
| 2,834,582 | Kablitz | May 13, 1958 |
| 2,898,743 | Bradley | Aug. 11, 1959 |
| 2,922,284 | Danielson | Jan. 26, 1960 |
| 2,931,188 | Levit | Apr. 5, 1960 |
| 2,932,953 | Becket | Apr. 19, 1960 |
| 2,947,150 | Roeder | Aug. 2, 1960 |
| 2,966,033 | Hughel | Dec. 27, 1960 |
| 2,978,875 | Lackey | Apr. 11, 1961 |
| 2,986,009 | Gaysowski | May 30, 1961 |